United States Patent
Ishii

(10) Patent No.: US 8,369,042 B2
(45) Date of Patent: Feb. 5, 2013

(54) CARTRIDGE MISINSERTION PREVENTING MECHANISM AND MAGNETIC TAPE LIBRARY DEVICE CELL

(75) Inventor: Hiroaki Ishii, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/367,962

(22) Filed: Feb. 7, 2012

(65) Prior Publication Data

US 2012/0207539 A1    Aug. 16, 2012

(30) Foreign Application Priority Data

Feb. 10, 2011   (JP) .................. 2011-026886

(51) Int. Cl.
*G11B 5/008* (2006.01)
(52) U.S. Cl. .................................... 360/92.1
(58) Field of Classification Search .......... 360/84, 360/85, 90, 96.61, 130.2, 291, 261.1, 77.12, 360/125.31, 294.7, 129, 241.1
See application file for complete search history.

(56) References Cited

U.S. PATENT DOCUMENTS 8,030,576 B2 * 10/2011 Kamei et al. ............ 174/255
2011/0131782 A1   6/2011 Suzuki et al.

FOREIGN PATENT DOCUMENTS

| JP | 11-045534 A | 2/1999 |
| JP | 2010-067316 A | 3/2010 |
| JP | 2010-086578 A | 4/2010 |

* cited by examiner

*Primary Examiner* — Allen Cao
(74) *Attorney, Agent, or Firm* — McGinn IP Law Group, PLLC

(57) ABSTRACT

Provided are: a first entry preventing nail that interferes with a cartridge at a position closer to an insertion/extraction port than an insertion completed position of an insertion-side end face of the cartridge inserted first; a second entry preventing nail at a position with a space from the first entry preventing nail slightly longer than length of the cartridge, which allows entry of the cartridge and retreat of the first entry preventing nail at that position when a tapered face of the cartridge is at that position while preventing the entry of the cartridge and retreat of the first entry preventing nail at that position when the tapered face of the cartridge is not at that position; and a linkage module which allows advancing and retreating actions of the first and second entry preventing nails in a tradeoff relation.

5 Claims, 9 Drawing Sheets

CARTRIDGE MISINSERTION PREVENTING MECHANISM AND MAGNETIC TAPE LIBRARY DEVICE CELL

CROSS-REFERENCE TO RELATED APPLICATION

This application is based upon and claims the benefit of priority from Japanese patent application No. 2011-026886, filed on Feb. 10, 2011, the disclosure of which is incorporated herein in its entirety by reference.

BACKGROUND OF THE INVENTION

1. Field of the Invention

The present invention relates to a cell of a magnetic tape library device which includes a housing space for housing a plurality of magnetic tape cartridges in series by aligning the directions thereof and an insertion/extraction port for inserting and extracting the plurality of magnetic tape cartridges, and to a cartridge misinsertion preventing mechanism thereof.

2. Description of the Related Art

As a technique related to preventing misinsertion of the magnetic tape cartridges, a library device disclosed in Japanese Unexamined Patent Publication 2010-86578 (paragraphs 0005, 0021, FIG. 6A, FIG. 6B, FIG. 6C) (Patent Document 1), for example, is known.

This is a technique with which a medium position detecting mechanism constituted with a color filter, an arm rotating mechanism, and the like is provided to each housing position of each magnetic tape cartridge, and misplacement of the magnetic tape cartridges is detected by an optical detecting module constituted with a light source and a mirror. However, the structure thereof is complicated, so that the manufacturing cost of the magnetic tape library device is increased substantially.

Further, this device has only a function of detecting the misplacement of the magnetic tape cartridges but has no function of preventing misinsertion of the magnetic tape cartridge itself.

In the meantime, as the cartridge misinsertion preventing mechanism of the magnetic tape library device cell which is designed to house a plurality of magnetic tape cartridges in series by aligning the directions thereof, those disclosed in Japanese Unexamined Patent Publication 2010-86578 (paragraphs 0005, 0021, FIG. 6A, FIG. 6B, FIG. 6C) (Patent Document 2) and the like, for example, are already known.

In general, as shown in FIG. 8, a magnetic tape cartridge 100 includes a tapered face d, which is formed by a face that is oblique to an insertion-side end face a and one side-face b and orthogonal to another one-end face c and is connected to the insertion-side end face a, the one side-face b, and the another one side-face c in width of less than the thickness of the magnetic tape cartridge 100 in the normal direction of the another one side-face c at a corner part X formed by the one side-face b adjacent to the insertion-side end face a, the another one side-face c adjacent to the insertion-side end face a and the one side-face b, and the insertion-side end face a in order to clarify the insertion direction of the magnetic tape cartridge 100.

Further, a magnetic tape library device cell 101 which houses a plurality of magnetic tape cartridges 100 in series by aligning the directions thereof includes a housing space 102 for housing the plurality of magnetic tape cartridges 100 and an insertion/extraction port 103 for inserting and extracting those magnetic tape cartridges 100 as shown in FIG. 9, for example.

As shown in FIG. 9, for example, a conventional cartridge misinsertion preventing mechanism disclosed in Patent Document 2 and the like is constituted with an entry preventing nail 104 fixed by being projected inside the housing space 102 from an inner wall 13 of the housing space 102 corresponding to the one side-face b of the magnetic tape cartridge 100 in a position slightly closer to the insertion/extraction port 103 than the insertion completed position of the insertion-side end face a of the magnetic tape cartridge 100 inserted first and where the isolated distance in the normal direction from the another one side-face c of the magnetic tape cartridge 100 in a housed state is within a range of the width of the tapered face d.

That is, through fixing the entry preventing nail 104 at the position where isolated distance from the another one side-face c of the magnetic tape cartridge 100 inserted first is within the range of the width of the tapered face d, the magnetic tape cartridge is allowed to be inserted into the insertion completed position that is at the farther position than the entry preventing nail 104 by providing no interference between a corner part X and the entry preventing nail 104 for the first magnetic tape cartridge 100 inserted in an appropriate direction as shown in FIG. 9. In the meantime, for the first magnetic tape cartridge 100 inserted in an inappropriate direction, a corner part located on an diagonal line of the corner part X on the insertion-side end face a of the first magnetic tape cartridge 100 or a corner part of an opposite-to-insertion-side end face e (see FIG. 8) is designed to interfere with the entry preventing nail 104 so as to prevent misinsertion of the magnetic tape cartridge 100.

However, such structure can only prevent the misinsertion of the magnetic tape cartridge 100 to be inserted first but cannot prevent misinsertion of the magnetic tape cartridges 100 inserted thereafter. For example, as shown in FIG. 9, even if the next magnetic tape cartridge 100 is inserted with its front and rear sides being reversed, the two magnetic tape cartridges 100 are finely housed within the housing space as long as the direction of the magnetic tape cartridge 100 inserted first is appropriate.

As a device capable for being converted into a magnetic tape library device as a technique for preventing misinsertion of the second cartridge and thereafter, a tape cartridge automatic loader disclosed in Japanese Unexamined Patent Publication Hei 11-45534 (paragraphs 0022, 0032, FIG. 6, FIG. 10) (Patent Document 3), for example, is known.

This is in a structure in which a misinsertion preventing module that is retreated by being pressed by a tilt face of a cartridge is placed inside a housing space, and the misinsertion preventing module is abutted against a straight-up face of the cartridge inserted inappropriately to prevent the misinsertion of the cartridge. Thus, under a specific condition, i.e., in a case where a plurality of cartridges are inserted one by one with a time interval, it is possible to appropriately prevent the misinsertion of the second cartridge and thereafter.

However, as shown in FIG. 9, for example, in a case where the opposite-to-insertion-side end faces e (see FIG. 8) of two magnetic tape cartridges 100 are abutted against each other and the first magnetic tape cartridge 100 is inserted in an appropriate direction, it is not possible to prevent the misinsertion of the magnetic tape cartridge inserted thereafter.

This is because a continuous flat face is formed by the side faces of the two magnetic tape cartridges 100 whose opposite-to-insertion-side end faces e (see FIG. 8) are being abutted against each other as shown in FIG. 9, i.e., the one side-face b of the magnetic tape cartridge 100 to be inserted first and the another side-face f of the magnetic tape cartridge 100 to be inserted next (corresponds to top face in FIG. 6 and FIG. 10 of Patent Document 3), so that a return action of the misinsertion preventing module cannot be executed by being impeded by the continuous flat face and insertion of the next magnetic cartridge 100 is allowed even when the opposite-to-insertion-side end face e (see FIG. 8) of the magnetic tape cartridge 100 inserted first passes the set position of the misinsertion preventing module.

While FIG. 9 shows a case where the first magnetic tape cartridge 100 is inserted in an appropriate direction and the next magnetic tape cartridge 100 is to be inserted with its front and rear sides being reversed and its opposite-to-insertion-side end face e being abutted against the opposite-to-insertion-side end face e of the first magnetic tape cartridge 100 as a way of example, the same issue is also generated in a case where the next magnetic tape cartridge 100 is to be inserted with its top and back faces being reversed and its insertion-side end face a being abutted against the opposite-to-insertion-side end face e of the first magnetic tape cartridge 100 and in a case where the next magnetic tape cartridge 100 is to be inserted with its front and rear sides as well as its top and back faces being reversed and its opposite-to-insertion-side end face e being abutted against the opposite-to-insertion-side end face e of the first magnetic tape cartridge 100. It is therefore an exemplary object of the present invention to provide a simple-structure cartridge misinsertion preventing mechanism capable of securely preventing misinsertion of magnetic tape cartridges, particularly misinsertion of the second magnetic tape cartridge and thereafter and misinsertion of the magnetic tape cartridges whose opposite-to-insertion-side end faces are abutted against each other, i.e., misinsertion even under a state where a continuous flat face is formed in the side faces of the magnetic tape cartridges, without requiring a complicated medium position detecting mechanism and an optical detection module.

SUMMARY OF THE INVENTION

The cartridge misinsertion preventing mechanism according to the present invention is a cartridge misinsertion preventing mechanism provided to cells of a magnetic tape library device which includes: a housing space for housing, by aligning directions, a plurality of magnetic tape cartridges in series each including a tapered face which is formed at a corner part formed by one side-face adjacent to an insertion-side end face, another one side-face adjacent to the insertion-side end face and the one-side face, and the insertion-side end face by a face oblique to the insertion-side end face and the one side-face and orthogonal to the another one side-face and is connected to the insertion-side end face, the one side-face, and the another one side-face in width less than thickness of the another one side-face in a normal direction; and an insertion/extraction port for inserting and extracting the plurality of magnetic tape cartridges. In order to achieve the foregoing exemplary object, the cartridge misinsertion preventing mechanism of the present invention includes: a first entry preventing nail capable of advancing and retreating to/from the housing space from an inner wall of the housing space corresponding to the one side-face of the magnetic tape cartridge at a position that is slightly closer to the insertion/extraction port than an insertion completed position of the insertion-side end face of the magnetic tape cartridge to be inserted first and where an isolated distance from the another one side-face of the magnetic tape cartridge in a housed state in a normal direction is greater than the width of the tapered face; a second entry preventing nail capable of advancing and retreating to/from the housing space from the inner wall of the housing space corresponding to the one side-face of the magnetic tape cartridge at a position that is closer to the insertion/extraction port with a space slightly longer than length of the magnetic tape cartridge in an insertion/extraction direction of the magnetic tape cartridge provided from the first entry preventing nail and where the isolated distance from the another one side-face of the magnetic tape cartridge in a housed state in the normal direction is within the width of the tapered face; a linkage module which is connected to the first and second entry preventing nails and allows advancing and retreating actions of the first and second entry preventing nails to/from the housing space in a tradeoff relation; and a linkage energizing module which steadily energizes the linkage module to a direction along which the first entry preventing nail retreats from the housing space and the second entry preventing nail enters inside the housing space.

DETAILED DESCRIPTION OF THE PREFERRED EMBODIMENTS

Next, an exemplary mode for embodying the present invention will be described in a specific manner by referring to the accompanying drawings.

Figure 1:
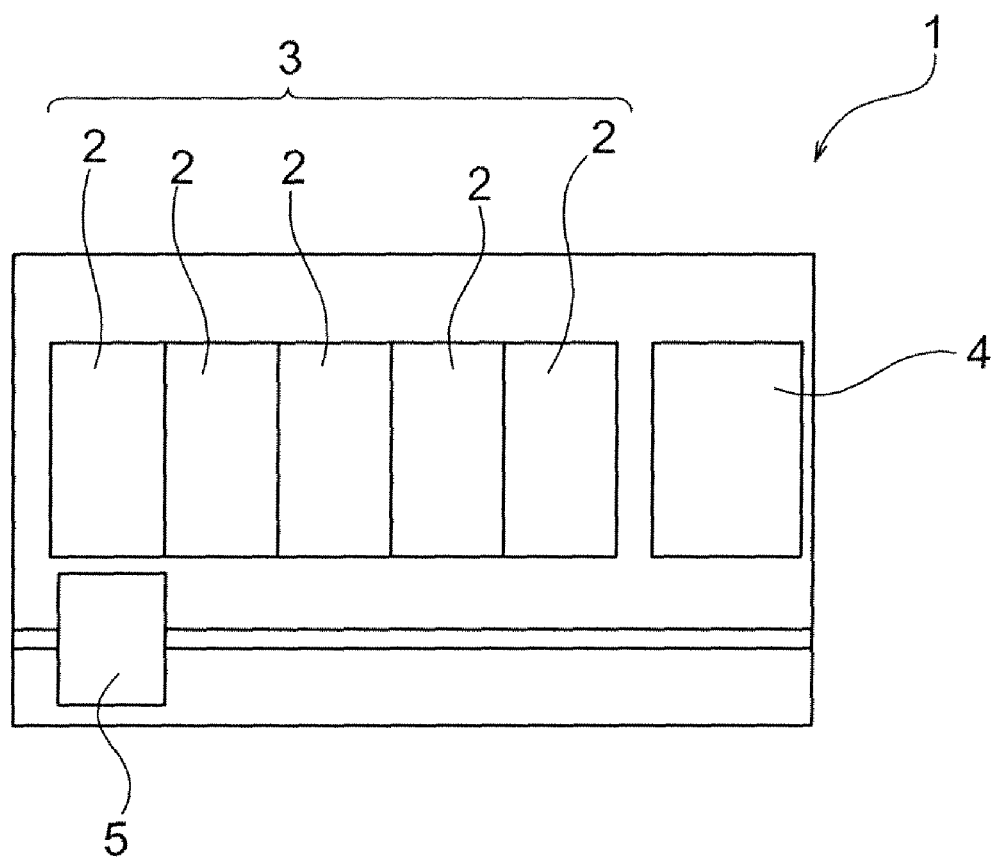
FIG. 1 is a simplified block diagram of an example of a magnetic tape library device which uses a magnetic tape library device cell according to an exemplary embodiment to which a cartridge misinsertion preventing mechanism of the present invention is applied.

FIG. 1 is a simplified block diagram of an example of a magnetic tape library device which uses a magnetic tape library device cell according to an exemplary embodiment to which a cartridge misinsertion preventing mechanism of the present invention is applied.

A magnetic tape library device 1 includes: a magazine 3 constituted by a group of magnetic library device cells 2; a drive unit 4 which reads and writes data to/from a magnetic tape within a magnetic tape cartridge 100; and an accessor 5 which delivers the magnetic tape cartridge 100 between the magnetic tape library device cell 2 and the drive unit 4.

The magazine 3 can be taken out to the outside from the magnetic tape library device 1. Two each of the magnetic tape cartridges 100 can be loaded or discharged manually to/from each of the magnetic tape library device cells 2 which constitute the magazine 3.

The magnetic tape library device 1, the magazine 3, the drive unit 4, and the accessor 5 are all known structural elements, so that specific explanations thereof are omitted.

Figure 8:
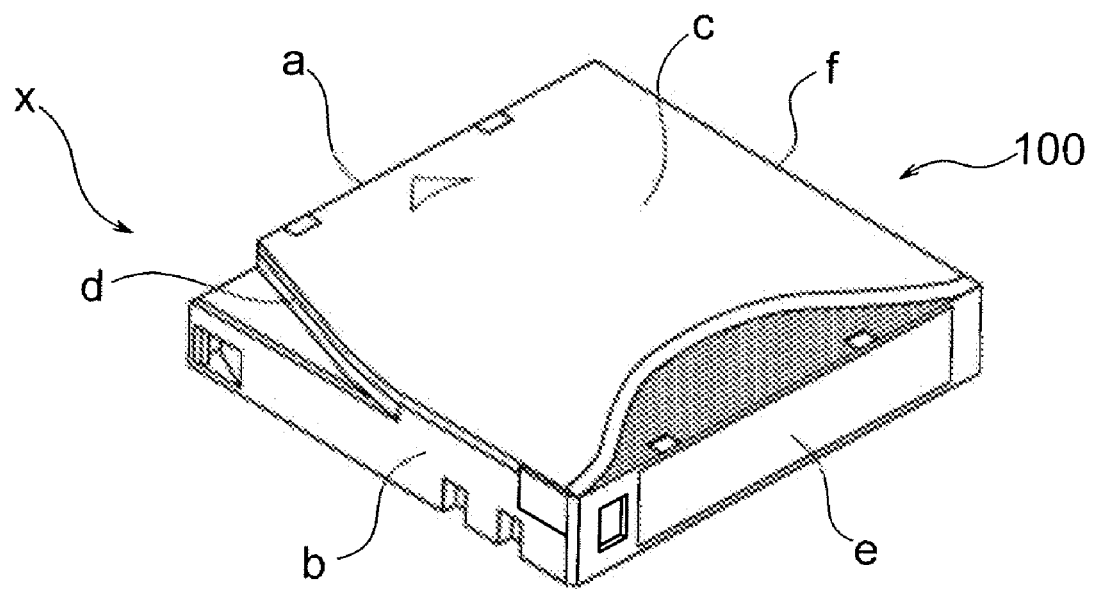
FIG. 8 is a perspective view showing an external appearance of a typical magnetic tape cartridge.
Figure 9:
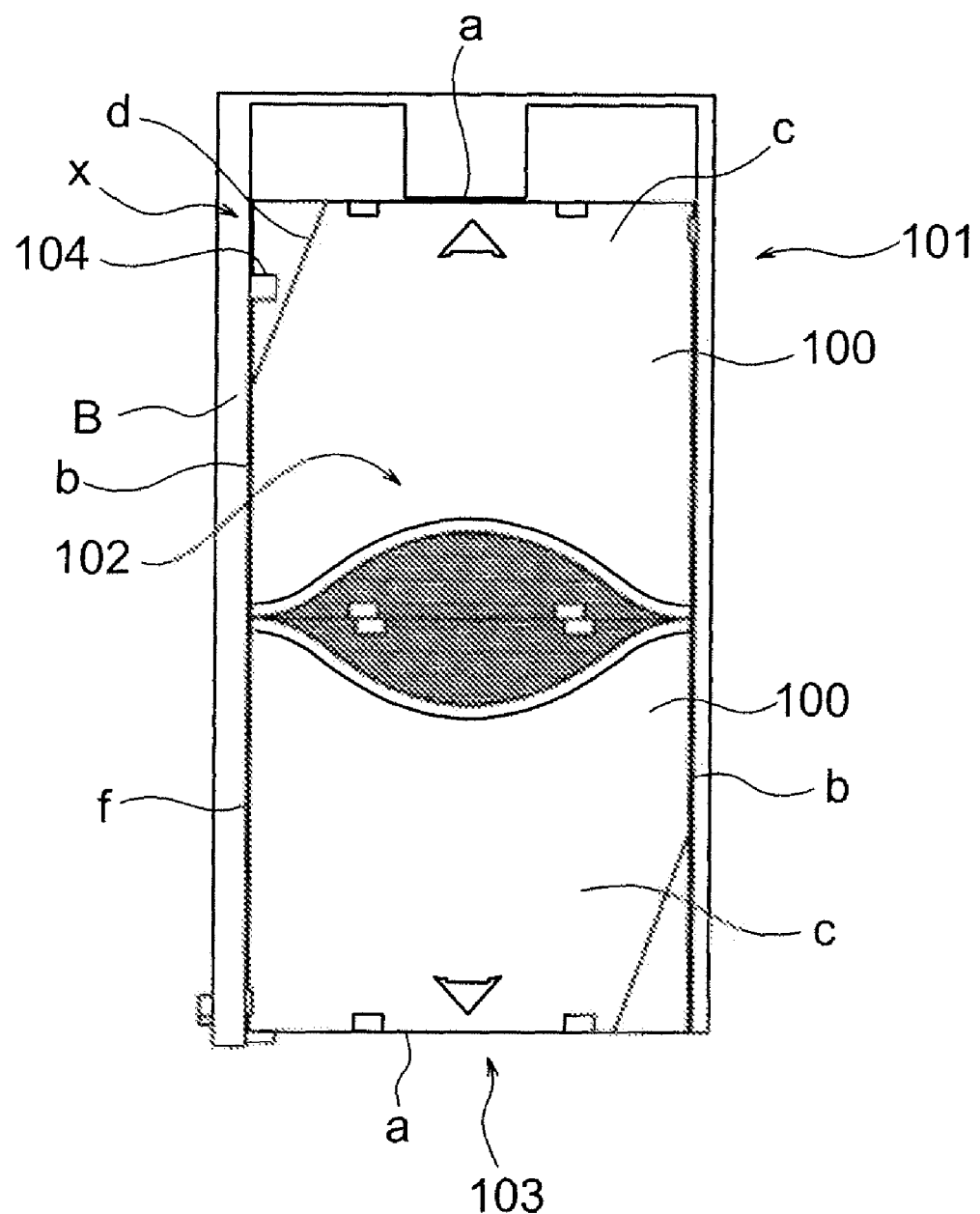
FIG. 9 is a plan view showing a known magnetic tape library device cell and a known cartridge misinsertion preventing mechanism.

The magnetic tape cartridge 100 is of standard specifications. As shown in FIG. 8, the magnetic tape cartridge 100 includes a tapered face d constituted with a face which is oblique to an insertion-side end face a and a one side-face hand orthogonal to an another one-end face c and also connected to the insertion-side end face a, the one side-face b, and the another one side-face c at a corner part X formed by the one side-face b adjacent to the insertion-side end face a, the one-end face c adjacent to the insertion-side end face a and the one side-face b, and the insertion-side end face a in width less than the thickness of the cartridge 100 in a normal direction of the one side-face c.

Hereinafter, in this exemplary embodiment, the another side-face located in parallel by forming a pair with the one side-face b of the magnetic tape cartridge 100 is called as another side-face f as shown in FIG. 8.

Figure 2:
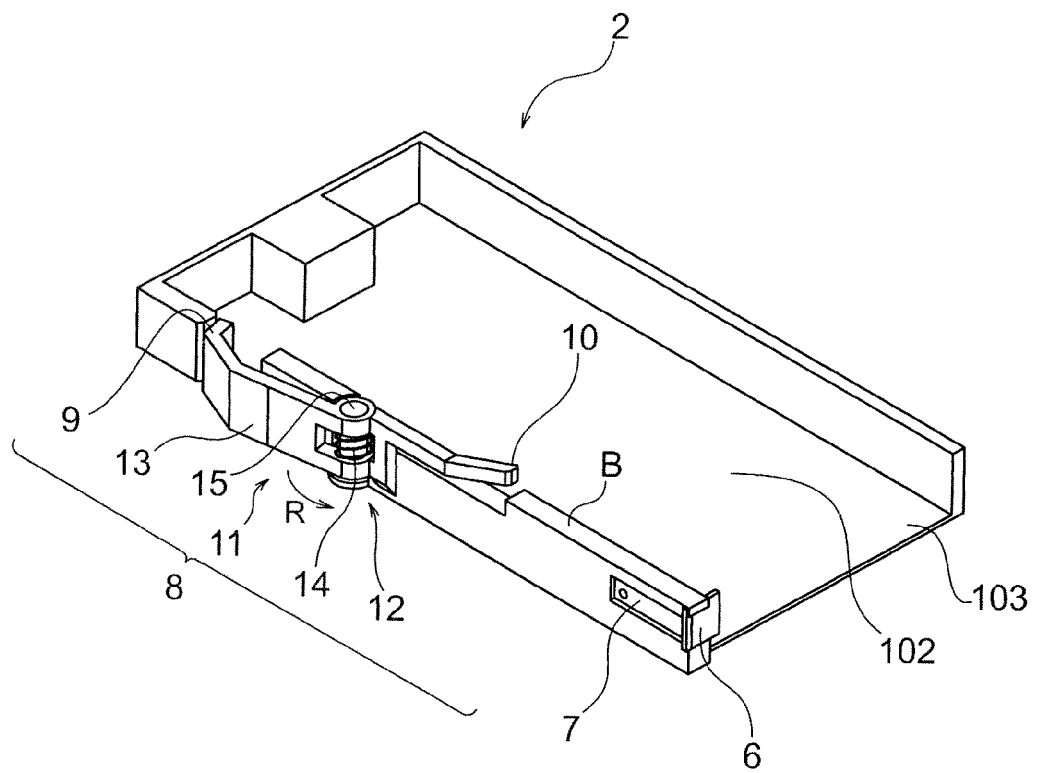
FIG. 2 is a perspective view showing the main part of the structure of the magnetic tape library device cell to which the cartridge misinsertion preventing mechanism of the exemplary embodiment is mounted.

The main part of the structure of the magnetic tape library device cell 2 to which the cartridge misinsertion preventing mechanism of the exemplary embodiment is mounted is shown in perspective view of FIG. 2.

The magnetic tape library device cell 2 is for housing two magnetic tape cartridges 100 in series (also called as bumping type) with directions thereof being aligned. The magnetic tape library cell 2 includes a housing space 102 for housing the two magnetic tape cartridges 100 and an insertion/extraction port 103 for inserting and extracting the magnetic tape cartridges 100. On one side of the insertion/extraction port 103, a latch 6 for preventing fall of the two magnetic tape cartridges 100 housed inside the housing space 102 is provided.

The latch 6 is attached to one side of the insertion/extraction port 103 via a plate spring 7. It is designed to prevent the fall of the two magnetic tape cartridges 100 housed inside the housing space 102 by engaging the tip of the latch 6 with the opposite-to-insertion-side end face e (see FIG. 8) of the second magnetic tape cartridge 100 housed inside the housing space 102.

Although not specifically illustrated in FIG. 8, a spring mechanism for steadily energizing the cartridge 100 housed inside the housing space towards the discharge direction is provided to the magnetic tape library device cell 2.

The housing space 102, the insertion/extraction port 103, the latch 6, and the spring mechanism are all known structural elements.

A cartridge misinsertion preventing mechanism 8 according to the exemplary embodiment includes: a first entry preventing nail 9 capable of advancing and retreating to/from the housing space 102 from an inner wall B of the housing space 102 corresponding to the one side-face b of the magnetic tape cartridge 100, which is placed at a position slightly closer to the insertion/extracting port 103 than the insertion completed position of the insertion-side end face a of the magnetic tape cartridge 100 inserted first and also at a position where the isolated distance in the normal direction from the one side-face c of the magnetic tape cartridge 100 in a housed state is greater than the width of the tapered face d of the magnetic tape cartridge 100; a second entry preventing nail 10 capable of advancing and retreating to/from the housing space 102 from the inner wall B of the housing space 102 corresponding to the one side-face b of the magnetic tape cartridge 100, which is placed at a position slightly closer to the insertion/extracting port 103 with a space from the first entry preventing nail 9 slightly longer than the length of the insertion/extraction direction of the magnetic tape cartridge 100 being provided and also at a position where the isolated distance in the normal direction from the one side-face c of the magnetic tape cartridge 100 in a housed state is within a range of the width of the tapered face d of the magnetic tape cartridge 100; a linkage module 11 which is connected to the first entry preventing nail 9 and the second entry preventing nail 10, and allows the advancing/retreating actions of the first entry preventing nail 9 and the second entry preventing nail 10 to/from the housing space 102 in a tradeoff relation; and a linkage energizing module 12 which steadily energizes the linkage module II in a direction along which the first entry preventing nail 9 retreats from the housing space 102 and the second entry preventing nail 10 enters inside the housing pace 102.

As shown in FIG. 2, the first entry preventing nail 9 according to the exemplary embodiment has width corresponding to the thickness of the magnetic tape cartridge 100 in the normal direction of the another one side-face c (see FIG. 8) of the magnetic tape cartridge 100. Actually, however, it is fine when at least the first entry preventing nail 9 or a part thereof can enter the housing space 102 from the inner wall B of the housing space 102 corresponding to the one side-face b of the magnetic tape cartridge 100 at a position where the isolated distance in the normal direction from the another one side-face c of the housed magnetic tape cartridge 100 in a housed state is greater than the width of the tapered face d of the magnetic tape cartridge 100. That is, it is an essential element of the first entry preventing nail 9 in terms of the structure to be formed as a structure which abuts against the insertion-side end face a of the magnetic tape cartridge 100 inserted first into the housing space 102 in an appropriate direction and is capable of preventing the magnetic tape cartridge 100 from entering the insertion completed position in a state where the first entry preventing nail 9 has entered inside the housing space 102.

Figure 5:
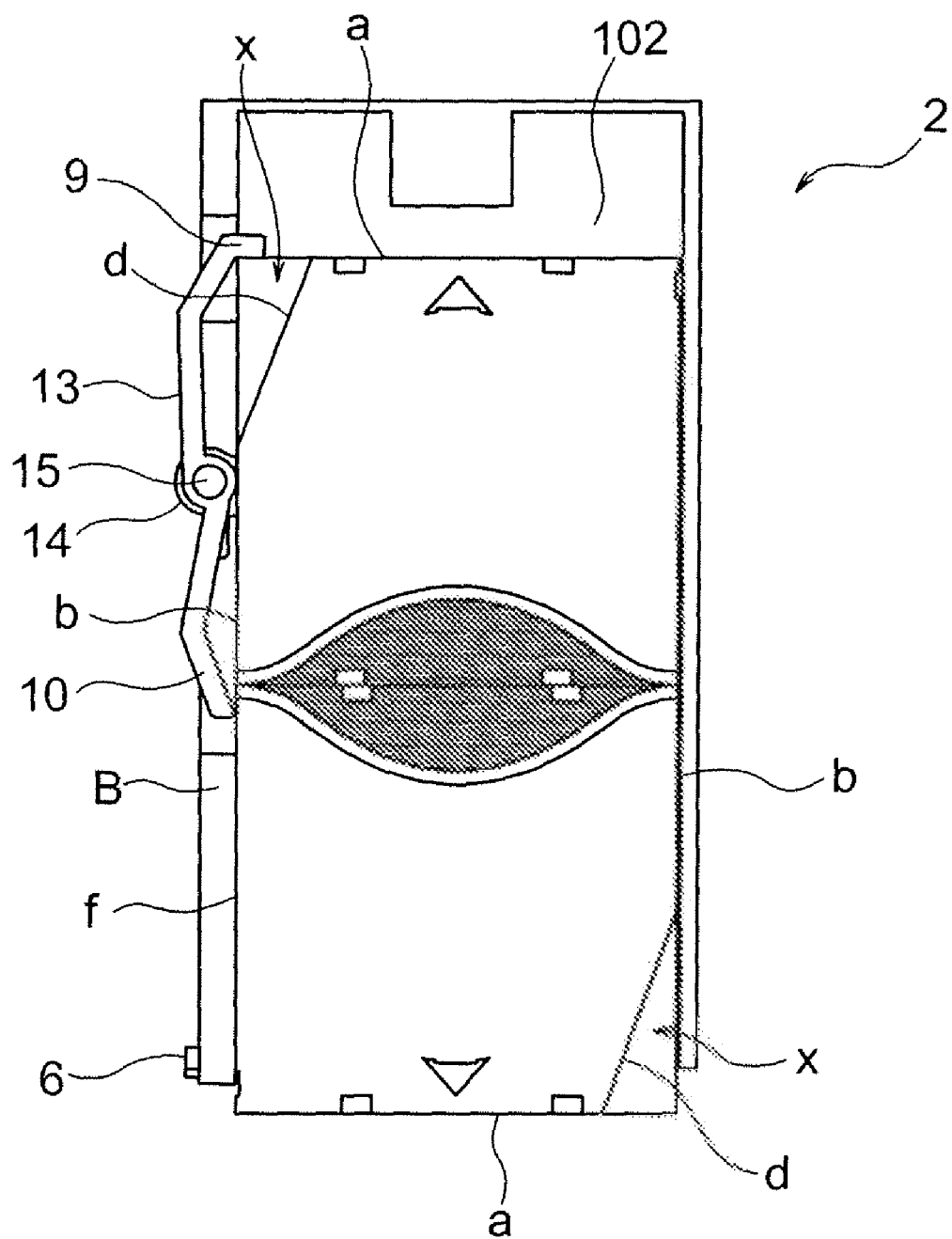
FIG. 5 is a plan view showing an example of a state where the first magnetic tape cartridge is inserted in an appropriate direction and a next magnetic tape cartridge is inserted by being abutted against the first magnetic tape cartridge in a wrong direction.

If the entire part of the first entry preventing nail 9 is to exist within a range of the width of the tapered face d of the magnetic tape cartridge 100 in the isolated distance in the normal direction from the one side-face c of the housed magnetic tape cartridge 100 in a housed state, the first entry preventing nail 9 is pushed out towards outside of the housing space 102 due to a sliding-contact action between the tapered face d of the magnetic tape cartridge 100 inserted first into the housing space 102 in an appropriate direction and the first entry preventing nail 9 when there is inconsistency in the inserting direction of the magnetic tape cartridge to be inserted next, i.e., under a condition shown in FIG. 5. Thus, a further advancing action of the magnetic tape cartridge 100 inserted first is allowed, so that both the magnetic tape cartridge 100 inserted first into the housing space 102 in an appropriate direction and the next magnetic tape cartridge 100 whose inserting direction is inconsistent are to reach the insertion completed position. Therefore, it is necessary to employ the structure described above.

The reason that the width of the first entry preventing nail 9 in this exemplary embodiment is set to be the width corresponding to the thickness of the magnetic tape cartridge 100 is for simply improving the durability.

Further, as shown in FIG. 2, the second entry preventing nail 10 according to the exemplary embodiment has width corresponding to the width of the tapered face d (see FIG. 8) of the magnetic tape cartridge 100 in the normal direction of the one side-face c of the magnetic tape cartridge 100. Actually, however, the width of the second entry preventing nail 10 may be narrower than the width of the tapered face d of the magnetic tape cartridge 100.

That is, it is an essential element of the second entry preventing nail 10 in terms of the structure to be formed as a structure which abuts against the insertion-side end face a and the opposite-to-insertion-side end face e (see FIG. 8) of the magnetic tape cartridge 100 inserted into the housing space 102 in an inappropriate direction and slide-contacts against the tapered face d of the magnetic tape cartridge 100 inserted into the housing space 102 in an appropriate direction.

The reason that the width of the second entry preventing nail 10 in this exemplary embodiment is set to be the width corresponding to the width of the tapered face d of the magnetic tape cartridge 100 is for simply improving the durability.

The linkage module 11 according to the exemplary embodiment is constituted with a misinsertion preventing lever 13 whose center part is supported axially to be freely rotatable in a posture along the inner wall B of the housing space 102 corresponding to the one side-face b of the magnetic tape cartridge 100 inserted in an appropriate direction, which is formed integrally with the first entry preventing nail 9 and the second entry preventing nail 10.

Further, the linkage energizing module 12 is constituted with a rotation energizing module 14 which energizes rotation of the misinsertion preventing lever 13 in the direction to which the second entry preventing nail 10 enters the housing space 102 and the first entry preventing nail 9 retreats from the housing space 102, i.e., in the direction of an arrow R shown in FIG. 2.

The rotation energizing module 14 according to the exemplary embodiment is constituted with a twisted coil spring attached to wrap around a pin 15 which axially supports the center part of the misinsertion preventing lever 13 to be freely rotatable. However, it is also possible to provide a tongue-like piece in the center part of the misinsertion preventing lever 13 integrally to use it as the rotation energizing module 14, or possible to use a plate spring, a coil spring, or the like provided at a proper point, in a case where the misinsertion preventing lever 13 is formed by a synthetic resin or the like exhibiting sufficient elasticity.

The misinsertion preventing lever 13 which includes the first entry preventing nail 9 on one end and the second entry preventing nail 10 on the other end is a structure which rotates on the pin 15 provided along the normal direction of the another one side-face c of the housed magnetic tape cartridge 100, so that the advancing/retreating action of the first entry preventing nail 9 and the second entry preventing nail 10 to/from the housing space 102 becomes a tradeoff relation naturally.

Figure 3:
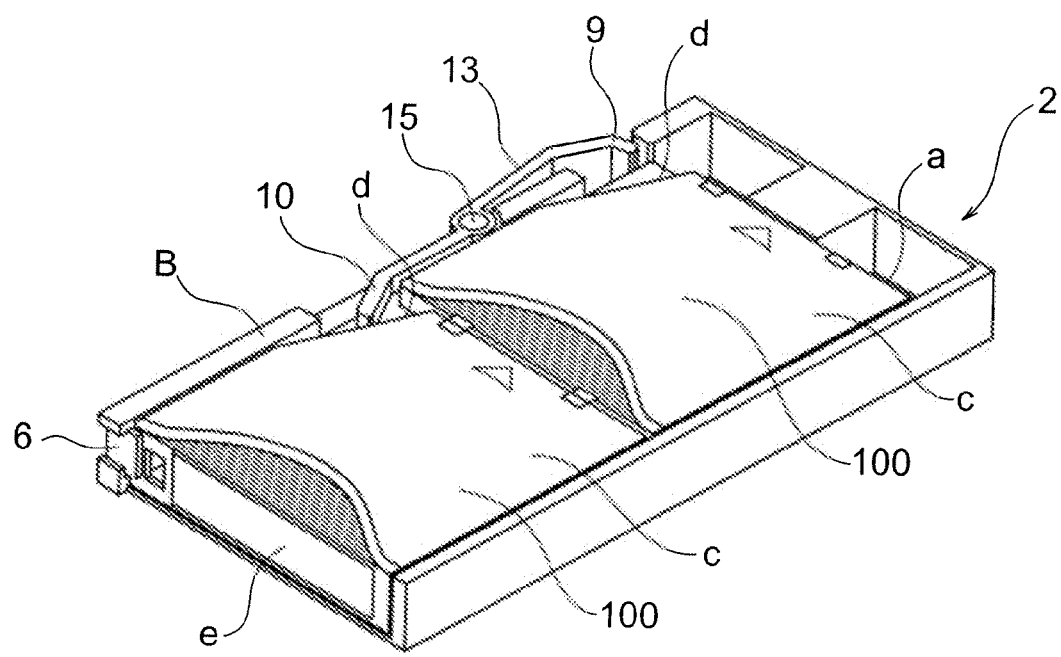
FIG. 3 is a perspective view showing a state where two magnetic tape cartridges are appropriately housed in a housing space of the magnetic tape library device cell of the exemplary embodiment.

A state where two magnetic tape cartridges 100 are housed appropriately within the housing space 102 of the magnetic tape library device cell 2 is shown in a perspective view of FIG. 3 for reference.

Next, actions and function of the cartridge misinsertion preventing mechanism 8 according to the exemplary embodiment will be described in a specific manner.

Figure 4:
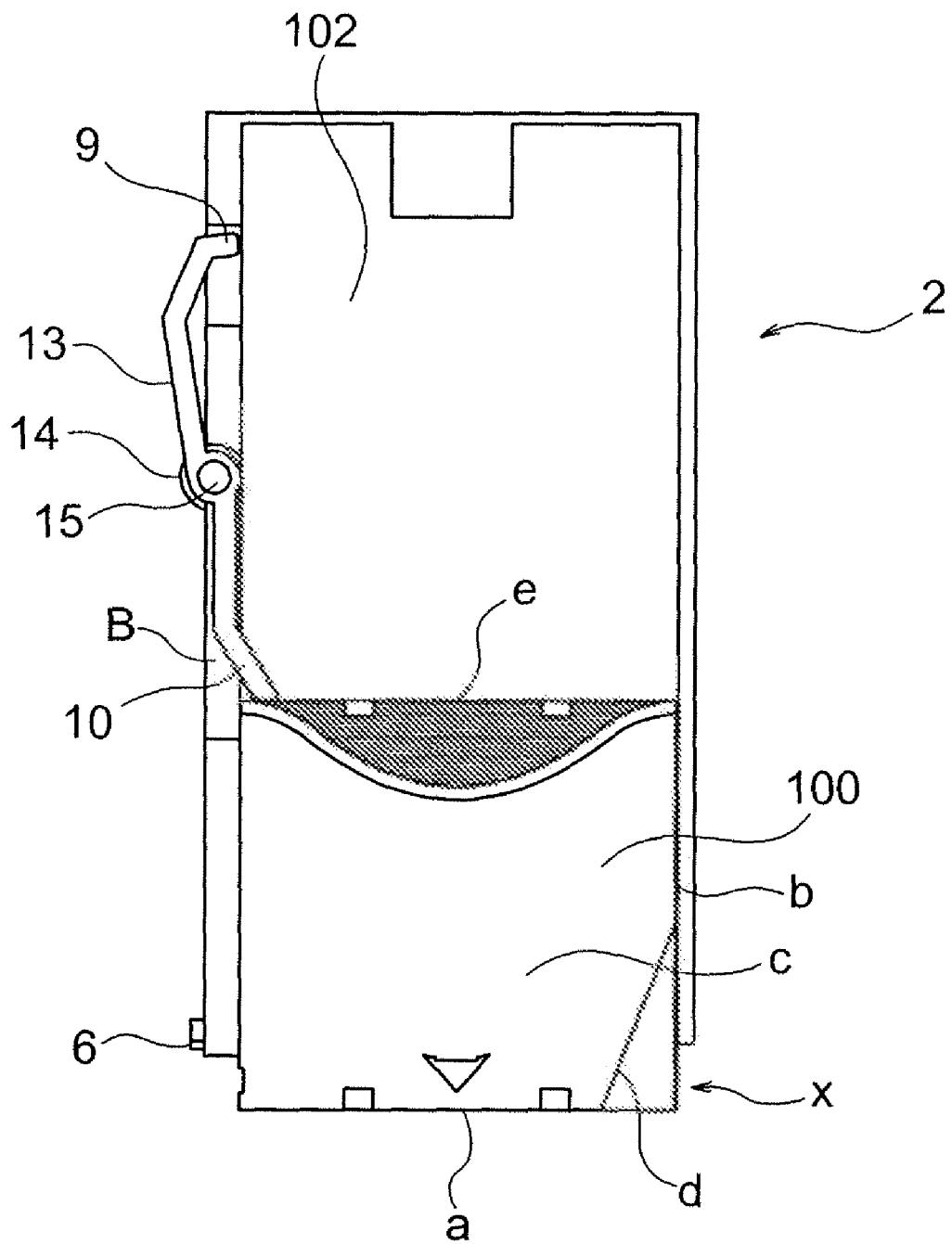
FIG. 4 is a plan view showing an action of the cartridge misinsertion preventing mechanism when the direction of the magnetic tape cartridge at the time of first insertion is wrong.

FIG. 4 is a plan view showing an action of the cartridge misinsertion preventing mechanism 8 when the direction of the magnetic tape cartridge 100 at the time of first insertion is wrong. In FIG. 4, shown is a case where the magnetic tape cartridge 100 to be inserted first is inserted from the opposite-to-insertion-side end face e by reversing the front and rear sides thereof. However, the operation principle itself of the cartridge misinsertion preventing mechanism 8 is the same also in a case where the magnetic tape cartridge 100 is inserted by reversing the top and back faces thereof.

That is, in any case, the second entry preventing nail 10 provided integrally to the other end of the misinsertion preventing lever 13 that is rotation-energized by the rotation energizing module 14 in the counterclockwise direction of FIG. 4 is in an initial state, i.e., in a state where it has entered into the housing space 102 from the inner wall B of the housing space 102, at a stage where the first magnetic tape cartridge 100 is to be inserted. Thus, when the first magnetic tape is tried to be inserted by reversing the front and rear sides thereof, the opposite-to-insertion-side end face e of the magnetic tape cartridge 100 interferes with the second entry preventing nail 10, thereby completely preventing the wrong insertion operation of the first magnetic tape cartridge. Further, in a case where the first magnetic tape is tried to be inserted by reversing the top and back faces thereof, the insertion-side end face a of the magnetic tape cartridge 100 interferes with the second entry preventing nail 10, thereby completely preventing the wrong insertion operation of the first magnetic tape cartridge.

Figure 6:
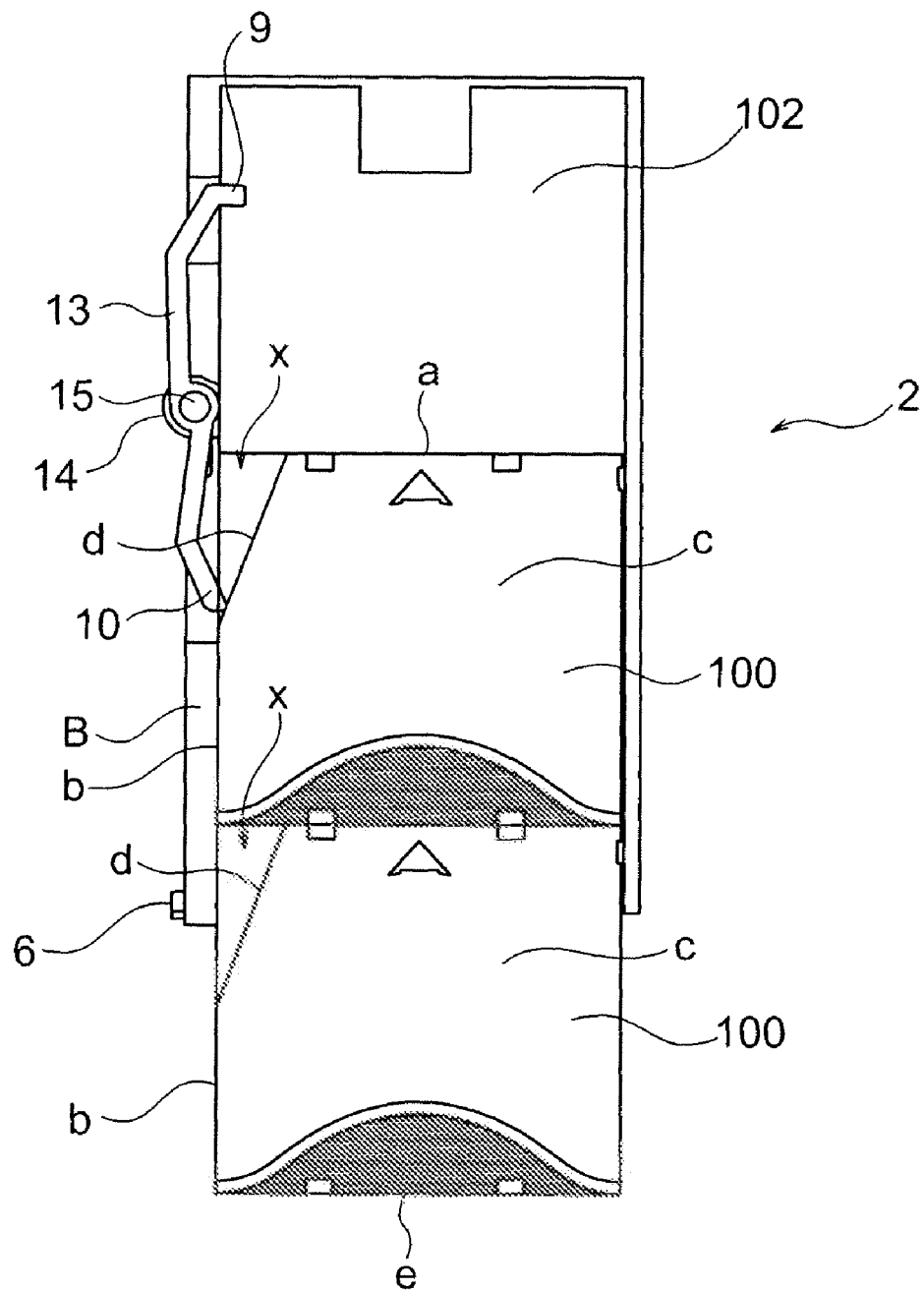
FIG. 6 is a plan view showing a state where the first magnetic tape cartridge and the second magnetic tape cartridge are inserted while being abutted against each other in an appropriate direction.

Insertion of the first magnetic tape cartridge 100 is allowed only in a case where the magnetic tape cartridge 100 is inserted with the one side-face b of the first magnetic tape cartridge 100 being in slid-contact to the inner wall B of the magnetic tape library device cell 2 (see FIG. 6, for example), i.e., in a case where the tapered face d formed in the first magnetic tape cartridge 100 slide-contacts to the second entry preventing nail 10 to rotate the misinsertion preventing lever 13 in the clockwise direction of FIG. 4 or FIG. 6 by resisting the energizing force of the rotation energizing module 14, so that the second entry preventing nail 10 is pushed out to the outside of the housing space 102.

Therefore, misinsertion of the first magnetic tape cartridge 100 in all the cases can be securely prevented only by the second entry preventing nail 10.

Further, when the second entry preventing nail 10 slide-contacts against the tapered face d of the magnetic tape cartridge 100 by appropriate insertion of the first magnetic tape cartridge 100 and the misinsertion preventing lever 13 rotates in the clockwise direction of FIG. 4 so that the first entry preventing nail 9 enters inside the housing space 102 from the inner wall B of the housing space 102, a state where the second entry preventing nail 10 retreats to the outside of the housing space 102 and the first entry preventing nail 9 enters inside the housing space 102 is maintained until the opposite-to-insertion-side end face e of the first magnetic tape cartridge 100 inserted in the appropriate direction passes the provided position of the second entry preventing nail 10 (see FIG. 6, for example).

If only the first magnetic tape cartridge 100 is inserted and then the first magnetic tape cartridge 100 is pushed in by fingers, for example, without inserting a next magnetic tape cartridge 100, the opposite-to-insertion-side end face e of the first magnetic tape cartridge 100 passes the position of the second entry preventing nail 10 before the insertion-side end face a of the first magnetic tape cartridge 100 reaches the position of the first entry preventing nail 9 since the isolated distance between the first entry preventing nail 9 and the second entry preventing nail 10 is a space slightly longer than the length of the magnetic tape cartridge 100 in the insertion/extraction direction (see FIG. 5, for example).

Therefore, the second entry preventing nail 10 loses the support of the one side-face b of the magnetic tape cartridge 100 inserted first at the point where the opposite-to-insertion-side end face e of the first magnetic tape cartridge 100 passes the position of the second entry preventing nail 10. As a result, the misinsertion preventing lever 13 returns to the initial state by being rotated in the counterclockwise direction of FIG. 4 again by the energizing force of the rotation energizing module 14, the first entry preventing nail 9 provided to one end of the misinsertion preventing lever 13 retreats from the housing space 102, and the second entry preventing nail 10 enters inside the housing space 102 from the inner wall B of the second entry preventing nail 10.

Therefore, if the first magnetic tape cartridge 100 inserted in the appropriate direction is continued to be pushed by the fingers, the first magnetic tape cartridge 100 can be allowed to be pushed into the insertion completed position. However, the second entry preventing nail 10 has already entered inside the housing space 102 from the inner wall B at this stage, so that a next magnetic tape cartridge 100 cannot be inserted in a wrong direction even if the next magnetic tape cartridge 100 is tried to be inserted with a time interval provided therebetween. Needless to say, the next magnetic tape cartridge 100 can be inserted in the appropriate direction.

However, actually, the spring mechanism for steadily energizing the one or two magnetic tape cartridge 100 towards the discharging direction by pushing the first magnetic cartridge 100 housed inside the housing space 120 is provided to the magnetic tape library device cell 2. Thus, there is almost no such case where the two magnetic tape cartridges 100 are inserted one by one with a time interval provided therebetween. It is common to insert the two magnetic tape cartridges 100 in a serially connected state by a manual operation force resisting to the energizing force in a state where the opposite-to-insertion-side end face e or the insertion-side face a of the first magnetic tape cartridge 100 and the insertion-side face a or the opposite-to-insertion-side face e of the next magnetic tape cartridge 100 are abutted against each other by the energizing force of the spring mechanism.

Even in a case where the two magnetic cartridge tapes 100 are inserted in a serially connected state, the second entry preventing nail 10 completely intervenes misinsertion of the first magnetic tape cartridge 100 by the reason described above and naturally makes it impossible to insert the next magnetic tape cartridge 100, when the front and rear sides as well as the top and back faces of the first magnetic tape cartridge 100 are reversed. Therefore, misinsertion of the magnetic tape cartridge can be completely prevented.

The issue is a case where the first magnetic tape cartridge 100 is inserted in the appropriate direction and the second magnetic cartridge 100 is to be inserted while being abutted against the first magnetic tape cartridge 100 in a wrong direction.

FIG. 5 shows an example of a case where the magnetic ape cartridges 100 are inserted in a state where the first magnetic tape cartridge 100 is inserted in the appropriate direction and the second magnetic cartridge 100 is inserted while being abutted against the first magnetic tape cartridge 100 in a wrong direction.

Shown as a way of example is in FIG. 5 is a case where the first magnetic tape cartridge 100 is inserted in the appropriate direction and the second magnetic tape cartridge 100 is to be inserted with its front and rear sides being reversed and its opposite-to-insertion-side end face e being abutted against the opposite-to-insertion-side end face e of the first magnetic tape cartridge 100. However, the operation principle itself of the cartridge misinsertion preventing mechanism 8 is completely the same also in a case where the second magnetic tape cartridge 100 is to be inserted with its top and back faces being reversed and its insertion-side end face a being abutted against the opposite-to-insertion-side end face e of the first magnetic tape cartridge 100 and in a case where the second magnetic tape cartridge 100 is to be inserted with its front and rear sides as well as the top and back faces being reversed and its opposite-to-insertion-side end face e being abutted against the opposite-to-insertion-side end face e of the first magnetic tape cartridge 100. In those cases, the insertion direction of the first magnetic tape cartridge 100 is appropriate. Thus, first, the tapered face d formed in the first magnetic tape cartridge 100 slide-contacts against the second entry preventing nail 10 to rotate the misinsertion preventing lever 13 in the clockwise direction of FIG. 5 by resisting the energizing force of the rotation energizing module 14, so that the second entry preventing nail 10 retreats from the housing space 102 to the outside and the first entry preventing nail 9 enters inside the housing space 102.

As described above, the isolated distance between the first entry preventing nail 9 and the second entry preventing nail 10 is a space slightly longer than the length of the magnetic tape cartridge 100 in the insertion/extraction direction. However, in a case where the next magnetic tape cartridge 100 is to be inserted by reversing the front and rear sides thereof as shown in FIG. 5, the one side-face b of the magnetic tape cartridge 100 inserted first and another side-face f of the magnetic tape cartridge 100 to be inserted next form a connected flat face. Thus, even when the opposite-to-insertion-side end face e of the first magnetic tape cartridge 100 inserted in the appropriate direction passes the providing position of the second entry preventing nail 10, another side-face f of the next magnetic tape cartridge 100 continues to support the second entry preventing nail 10. Therefore, as shown in FIG. 5, the state where the misinsertion preventing lever 13 is being rotated in the clockwise direction, i.e., the state where the second entry preventing nail 10 retreats from the housing space 102 towards the outside and the first entry preventing nail 9 enters inside the housing space 102, is maintained.

As described above, the isolated distance between the first entry preventing nail 9 and the second entry preventing nail 10 is a space slightly longer than the length of the magnetic tape cartridge 100 in the insertion/extraction direction. Thus, it is possible to push in the first magnetic tape cartridge 100 and the next magnetic tape cartridge 100 slightly towards the insertion completed position even after the opposite-to-insertion-side end face e of the magnetic tape cartridge 100 inserted first passes the providing position of the second entry preventing nail 10. However, at last, the insertion-side end face a of the first magnetic tape cartridge 100 interferes with the first entry preventing nail 9 entered inside the housing space 102, so that a push-in operation of the two magnetic tape cartridges 100 to push them further is not allowed.

As described above, the first entry preventing nail 9 is located slightly closer to the insertion/extraction port 103 than the insertion completed position of the insertion-side end face a of the magnetic tape cartridge 100 inserted first. Thus, in a case where the first magnetic tape cartridge 100 is inserted in the appropriate direction and the next magnetic tape cartridge 100 is to be inserted in an inappropriate direion, the rear end such as the insertion-side end face a or the opposite-to-insertion-side end face e of the next magnetic tape cartridge 100 is kept in astute of being slightly projected from the insertion/extraction port 103 of the magnetic tape library device cell 2. Therefore, fall thereof is not prevented by having the latch 6 engaged with the rear end of the next magnetic tape cartridge 100.

Thus, when the hand pushing-in the next magnetic tape cartridge 100 is let go, the two magnetic tape cartridges 100 are forcibly ejected from the insertion/extraction port 103 by the energizing force of the spring mechanism.

In a case where the first magnetic tape cartridge 100 is inserted in the appropriate direction and the next magnetic tape cartridge is inserted with the front and rear sides being reversed and the opposite-to-insertion-side end face e being abutted against the opposite-to-insertion-side end face e of the first magnetic tape cartridge 100 and in a case where the first magnetic tape cartridge 100 is inserted in the appropriate direction and the next magnetic tape cartridge is inserted with the top and back faces being reversed and the insertion-side end face a being abutted against the opposite-to-insertion-side end face e of the first magnetic tape cartridge 100, the second entry preventing nail 10 is supported by another side-face f of the magnetic tape cartridge 100. In the meantime, in a case where the first magnetic tape cartridge 100 is inserted in the appropriate direction and the next magnetic tape cartridge is inserted with the front and rear sides as well as the top and bottom faces being reversed and the opposite-to-insertion-side end face e being abutted against the opposite-to-insertion-side end face e of the first magnetic tape cartridge 100, the second entry preventing nail 10 is supported by the one side-face b of the magnetic tape cartridge 100. However, the phenomenon generated at the time of misinsertion of the second magnetic tape cartridge 100 is completely the same as that described by referring to FIG. 5, i.e., the case where the first magnetic tape cartridge 100 is inserted in the appropriate direction and the next magnetic tape cartridge is to be inserted with the front and rear sides being reversed and the opposite-to-insertion-side end face e being abutted against the opposite-to-insertion-side end face e of the first magnetic tape cartridge 100.

Thus, in a case where there is only misinsertion generated in the next magnetic tape cartridge 100 by abutting the opposite-to-insertion-side end face e of the next magnetic tape cartridge 100 against the opposite-to-insertion-side end face e of the first magnetic tape cartridge 100, for example, i.e., in a case of misinsertion of the magnetic tape cartridge 100 generated under a state where a continuous flat face is formed with the two side-faces (b and f or b and b) of the magnetic tape cartridges 100 on the side corresponding to the inner wall B of the housing space 102 where the first and second entry preventing nails 9, 10 are provided due to continuous insertion of the magnetic tape cartridges 100, it is possible with the exemplary embodiment to securely prevent the misinsertion by using the first entry preventing nail 9 entered inside the housing space 102 and the opposite-to-insertion-side end face e of the first magnetic tape cartridge 100 whose entry is intervened by the first entry preventing nail 9.

In the meantime, as shown in FIG. 6, when the magnetic tape cartridges 100 are inserted in a state where the first magnetic tape cartridge 100 and the second magnetic tape cartridge 100 are appropriately abutted against each other, first, the tapered faced formed in the first magnetic tape cartridge 100 slide-contacts against the second entry preventing nail 10 and the misinsertion preventing lever 13 is rotated in the clockwise direction of FIG. 6 by resisting the energizing force of the rotation energizing module 14. Thereby, the second entry preventing nail 10 retreats from the housing space 102 to the outside thereof, and the first entry preventing nail 9 enters inside the housing space 102. This state is maintained until the opposite-to-insertion-side end face e of the first magnetic tape cartridge 100 inserted in the appropriate direction passes the providing position of the second entry preventing nail 10.

Further, the second entry preventing nail 10 loses the support of the one side-face b of the magnetic tape cartridge 100 inserted first at the point where the opposite-to-insertion-side end face e of the first magnetic tape cartridge 100 passes the position of the second entry preventing nail 10. As a result, the misinsertion preventing lever 13 returns to the initial state by being rotated in the counterclockwise direction again by the energizing force of the rotation energizing module 14, the first entry preventing nail 9 provided to one end of the misinsertion preventing lever 13 retreats from the housing space 102, and the second entry preventing nail 10 enters inside the housing space 102 from the inner wall B of the second entry preventing nail 10. As described above, the second entry preventing nail 10 is in a structure which enters inside the housing space 102 from the inner wall B of the housing space 102 at the position where the isolated distance from the another one side-face c of the housed magnetic tape cartridge 100 in the normal direction is within a range of the width of the tapered face d of the magnetic tape cartridge 100, so that it is possible to easily enter the notch part of the corner part X formed by the tapered face d provided to the next magnetic tape cartridge 100.

Further, as described above, the isolated distance between the first entry preventing nail 9 and the second entry preventing nail 10 is a space slightly greater than the length of a single magnetic tape cartridge 100 in the insertion/extraction direction. Thus, it is possible to smoothly execute retreat of the first entry preventing nail 9 for letting through the first magnetic tape cartridge 100, i.e., possible to smoothly execute the rotating action of the misinsertion preventing lever 13 in the counterclockwise direction, without abutting the insertion-side end face of the magnetic tape cartridge 100 inserted first against the first entry preventing nail 9, i.e., without having a bite between the components.

Further, since the first entry preventing nail 9 retreats from the housing space 102 immediately after the opposite-to-insertion-side end face e of the first magnetic tape cartridge 100 inserted in the appropriate direction passes the providing position of the second entry preventing nail 10, there is nothing that intervenes the inserting operation of the first magnetic tape cartridge 100 at the point where the insertion-side end face a of the first magnetic tape cartridge 100 reaches the providing position of the first entry preventing nail 9. Therefore, the first magnetic tape cartridge 100 and the second magnetic tape cartridge 100 can be easily pushed into the insertion completed position.

Figure 7:
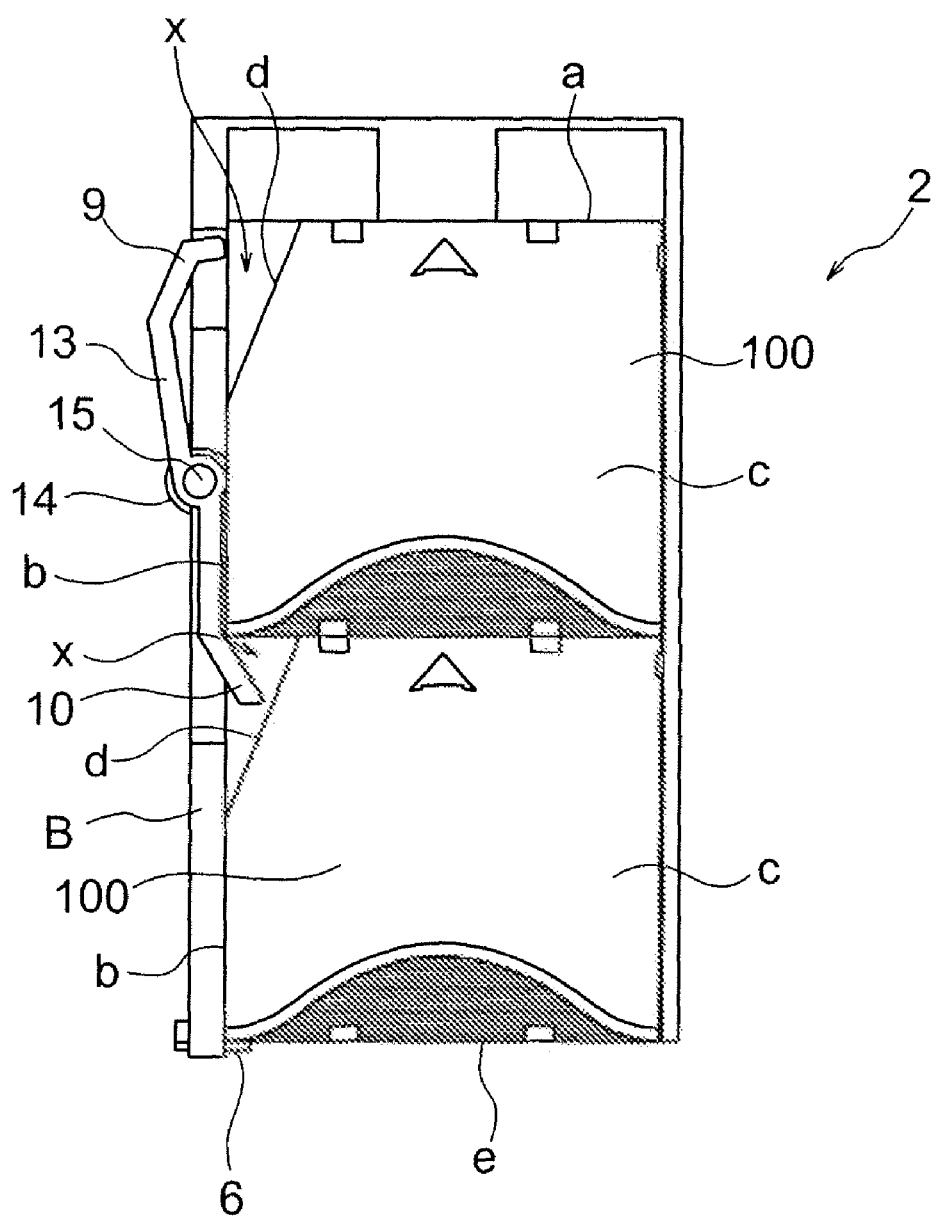
FIG. 7 is a plan view showing astute where two magnetic tape cartridges are completely inserted into the housing space of the magnetic tape library device cell.

FIG. 7 shows a state where two magnetic tape cartridges 100 are completely inserted into the housing space 102 of the magnetic tape library device cell 2, and the latch 6 is engaged with the rear end of the second magnetic tape cartridge 100.

As an exemplary advantage according to the invention, in the cartridge misinsertion preventing mechanism of the present invention, the first entry preventing nail for preventing entry of the magnetic tape cartridge by interfering with the magnetic tape cartridge regardless of existence of the tapered face of the magnetic tape cartridge in an entered state is provided at a position that is slightly closer to the insertion/extraction port than the insertion completed position of the insertion-side end face of the magnetic tape cartridge inserted first. At the same time, at a position with a space slightly greater than the length of the magnetic tape cartridge in the insertion/extraction direction from the first entry preventing nail, there is provided the second entry preventing nail which allows entry of the magnetic tape cartridge at that position and retreat of the first entry preventing nail from the housing space when there is the tapered face in the magnetic tape cartridge at that position while preventing entry of the magnetic tape cartridge at that position and retreat of the first entry preventing nail from the housing space when there is no tapered face in the magnetic tape cartridge at that position. Further, the linkage module which allows the advancing and retreating actions of the first and second entry preventing nails to/from the housing space in a tradeoff relation is steadily energized in the direction along which the first entry preventing nail retreats from the housing space and the second entry preventing nail enters inside the housing space. Thus, misinsertion of the first magnetic tape cartridge inserted in an inappropriate direction and misinsertion of the second magnetic tape cartridge and thereafter inserted in an inappropriate direction with a time interval after insertion of the first magnetic tape cartridge can all be prevented securely by the second entry preventing nail that has entered inside the housing space. Further, misinsertion of the second magnetic tape cartridge and thereafter by abutting the opposite-to-insertion-side end face against the first magnetic tape cartridge i.e., misinsertion of the magnetic tape cartridge generated under a state where a continuous flat face is formed with the side-faces of the magnetic tape cartridges on the side corresponding to the inner wall of the housing space where the first and second entry preventing nails are provided due to continuous insertion of the magnetic tape cartridges, can all be securely prevented by using the first entry preventing nail entered inside the housing space and the opposite-to-insertion-side end face of the first magnetic tape cartridge whose entry is intervened by the first entry preventing nail.

While the present invention has been described above by referring to each of the exemplary embodiments, the present invention is not limited only to each of those exemplary embodiments. Various changes and modifications occurred to those skilled in the art can be applied to the structures and details of the present invention. Further, the present invention includes combinations of a part of or a whole part of the structures of each of the above-described embodiments.

A part of or a whole part of the exemplary embodiment disclosed above can be appropriately expressed by following Supplementary Notes depicted below. However, it is to be noted that the modes for embodying the present invention and the technical spirit of the present invention are not limited only to those.

(Supplementary Note 1)

A cartridge misinsertion preventing mechanism (8) provided to cells (2) of a magnetic tape library device which includes: a housing space (102) for housing, by aligning directions, a plurality of magnetic tape cartridges (100) in series each including a tapered face (d) which is formed at a corner part (X) formed by one side-face (b) adjacent to an insertion-side end face (a), another one side-face (c) adjacent to the insertion-side end face (a) and the one-side face (b), and the insertion-side end face (a) by a face oblique to the insertion-side end face (a) and the one side-face (b) and orthogonal to the another one side-face (c) and is connected to the insertion-side end face (a), the one side-face (b), and the another one side-face (c) in width less than thickness of the another one side-face/c) in a normal direction; and an insertion/extraction port (103) for inserting and extracting the plurality of magnetic tape cartridges (100), and the cartridge misinsertion preventing mechanism includes: a first entry preventing nail (9) capable of advancing and retreating to/from the housing space (102) from an inner wall B of the housing space (102) corresponding to the one side-face (b) of the magnetic tape cartridge (100) at a position that is slightly closer to the insertion/extraction port (103) than an insertion completed position of the insertion-side end face (a) of the magnetic tape cartridge (100) to be inserted first and where an isolated distance from the another one side-face (c) of the magnetic tape cartridge in a housed state in a normal direction is greater than the width of the tapered face (d); a second entry preventing nail (10) capable of advancing and retreating to/from the housing space (102) from the inner wall (B) of the housing space (102) corresponding to the one side-face (b) of the magnetic tape cartridge (100) at a position that is closer to the insertion/extraction port (103) with a space slightly longer than length of the magnetic tape cartridge (100) in an insertion/extraction direction of the magnetic tape cartridge (100) provided from the first entry preventing nail (9) and where the isolated distance from the another one side-face (c) of the magnetic tape cartridge (100) in a housed state in the normal direction is within the width of the tapered face (d); a linkage module (11) which is connected to the first and second entry preventing nails (9, 10) and allows advancing and retreating actions of the first and second entry preventing nails (9, 10) to/from the housing space (102) in a tradeoff relation; and a linkage energizing module (12) which steadily energizes the linkage module (11) to a direction along which the first entry preventing nail (9) retreats from the housing space (102) and the second entry preventing nail (10) enters inside the housing space (102).

(Supplementary Note 2)

The cartridge misinsertion preventing mechanism (8) as depicted in Supplementary Note 1, wherein: the linkage module (11) is constituted with a misinsertion preventing lever (13) whose center part is axially supported to be freely rotatable in a posture along the inner wall (B) of the housing space (102) corresponding to the one side-face (b) of the magnetic tape cartridge (100), which is formed integrally with the first and second entry preventing nails (9, 10); and the linkage energizing module (12) is constituted with a rotation energizing module (14) which rotation-energizes the misinsertion preventing lever (13) in the direction along which the second entry preventing nail (10) enters inside the housing space (102).

(Supplementary Note 3)

The cartridge misinsertion preventing mechanism (8) as depicted in Supplementary Not 2, wherein the rotation energizing module (12) is constituted with a twisted coil spring attached to a pin (15) which axially supports the center part of the misinsertion preventing lever (13) to be freely rotatable.

(Supplementary Note 4)

The cartridge misinsertion preventing mechanism (8) as depicted in any one of Supplementary Notes 1, 2 and 3, wherein: the first entry preventing nail (9) has width corresponding to thickness of the magnetic tape cartridge (100) in the normal direction of the another one side-face (c); and the second entry preventing nail (10) has width of the tapered face (d) in the normal direction of the another one side-face (c).

(Supplementary Note 5)

A magnetic tape library device cell (2) which includes the cartridge misinsertion preventing mechanism (8) depicted in any one of Supplementary Notes 1, 2, 3, and 4.

Industrial Applicability

The present invention can be converted not only for cells that constitute a magazine of a magnetic tape library device but also as a cartridge misinsertion preventing mechanism in cells of various kinds of devices which employ cuboid cartridges.

What is claimed is:

1. A cartridge misinsertion preventing mechanism provided to cells of a magnetic tape library device which comprises: a housing space for housing, by aligning directions, a plurality of magnetic tape cartridges in series each comprising a tapered face which is formed at a corner part formed by one side-face adjacent to an insertion-side end face, another one side-face adjacent to the insertion-side end face and the one-side face, and the insertion-side end face by a face oblique to the insertion-side end face and the one side-face and orthogonal to the another one side-face and is connected to the insertion-side end face, the one side-face, and the another one side-face in width less than thickness of the another one side-face in a normal direction; and an insertion/extraction port for inserting and extracting the plurality of magnetic tape cartridges, the cartridge misinsertion preventing mechanism comprising:

a first entry preventing nail capable of advancing and retreating to/from the housing space from an inner wall of the housing space corresponding to the one side-face of the magnetic tape cartridge at a position that is slightly closer to the insertion/extraction port than an insertion completed position of the insertion-side end face of the magnetic tape cartridge to be inserted first and where an isolated distance from the another one side-face of the magnetic tape cartridge in a housed state in a normal direction is greater than the width of the tapered face;

a second entry preventing nail capable of advancing and retreating to/from the housing space from the inner wall of the housing space corresponding to the one side-face of the magnetic tape cartridge at a position that is closer to the insertion/extraction port with a space slightly longer than length of the magnetic tape cartridge in an insertion/extraction direction of the magnetic tape cartridge provided from the first entry preventing nail and where the isolated distance from the another one side-face of the magnetic tape cartridge in a housed state in the normal direction is within the width of the tapered face;

a linkage module which is connected to the first and second entry preventing nails and allows advancing and retreating actions of the first and second entry preventing nails to/from the housing space in a tradeoff relation; and a linkage energizing module which steadily energizes the linkage module to a direction along which the first entry preventing nail retreats from the housing space and the second entry preventing nail enters inside the housing space.

2. The cartridge misinsertion preventing mechanism as claimed in claim 1, wherein:

the linkage module is constituted with a misinsertion preventing lever whose center part is axially supported to be freely rotatable in a posture along the inner wall of the housing space corresponding to the one side-face of the magnetic tape cartridge, which is formed integrally with the first and second entry preventing nails; and the linkage energizing module is constituted with a rotation energizing module which rotation-energizes the misinsertion preventing lever in the direction along which the second entry preventing nail enters inside the housing space.

3. The cartridge misinsertion preventing mechanism as claimed in claim 2, wherein the rotation energizing module is constituted with a twisted coil spring attached to a pin which axially supports the center part of the misinsertion preventing lever to be freely rotatable.

4. The cartridge misinsertion preventing mechanism as claimed in claim 1, wherein:

the first entry preventing nail has width corresponding to thickness of the magnetic tape cartridge in the normal direction of the another one side-face; and the second entry preventing nail has width of the tapered face in the normal direction of the another one side-face.

5. A magnetic tape library device cell, comprising the cartridge misinsertion preventing mechanism claimed in claim 1.

* * * * *